United States Patent [19]
Hirschmann

[11] Patent Number: 5,122,712
[45] Date of Patent: Jun. 16, 1992

[54] METHOD AND CIRCUIT TO OPERATE A LOW-PRESSURE DISCHARGE LAMP, PARTICULARLY COMPACT FLUORESCENT LAMP

[75] Inventor: Walter Hirschmann, Munich, Fed. Rep. of Germany

[73] Assignee: Patent Treuhand Gesellschaft für elektrische Gluhlampen m.b.H., Munich, Fed. Rep. of Germany

[21] Appl. No.: 659,036

[22] Filed: Feb. 21, 1991

[30] Foreign Application Priority Data

Feb. 23, 1990 [DE] Fed. Rep. of Germany ....... 4005850

[51] Int. Cl.$^5$ ............................................. H05B 37/02
[52] U.S. Cl. .................................. 315/106; 315/107; 315/DIG. 5
[58] Field of Search ................ 315/106, 107, 200 R, 315/202, 203, 204, 205, 206, 208, 242, 243, DIG. 5

[56] References Cited

U.S. PATENT DOCUMENTS

| | | | |
|---|---|---|---|
| 4,647,817 | 3/1987 | Fahnrich et al. | 315/104 |
| 4,782,268 | 11/1988 | Fahnrich et al. | 315/200 R |
| 5,008,596 | 4/1991 | Kastl et al. | 315/205 |
| 5,027,033 | 6/1991 | Zuchtriegel | 315/106 |

Primary Examiner—Steven Mottola
Attorney, Agent, or Firm—Frishauf, Holtz, Goodman & Woodward

[57] ABSTRACT

To decrease the losses in the starting circuit for a compact fluorescent lamp, a positive temperature coefficient (PTC) resistor (KL) is connected in a resonance circuit of the lamp and also connected to the power supply of the lamp through a diode, polarized in blocking direction with respect to direct current, so that, before the lamp fires, a-c provided from an inverter (INV) can pre-heat the electrodes (E1, E2) of the lamp (LP), which will also cause current flow through the PTC resistor (KL); upon heating of the PTC resistor, this d-c current decreases and the voltage across the electrodes of the lamp will rise. When the lamp fires, it will drop below the supply voltage of the operating circuit for the lamp, thus causing the removal of the PTC resistor from the current carrying circuit, thereby eliminating energy loss through that resistor, and heating of the operating circuit assembly.

13 Claims, 3 Drawing Sheets

METHOD AND CIRCUIT TO OPERATE A LOW-PRESSURE DISCHARGE LAMP, PARTICULARLY COMPACT FLUORESCENT LAMP Reference to related patents, assigned to the assignee of the present application, the disclosures of which are hereby incorporated by reference:
U.S. Pat. No. 4,647,817, Fähnrich et al.
U.S. Pat. No. 4,782,268, Fähnrich et al.

FIELD OF THE INVENTION

The present invention relates to a circuit to operate a low-pressure discharge lamp, for example a compact fluorescent lamp, with high-frequency derived, initially, from an a-c power network, and to a method of operation of such a lamp.

BACKGROUND

The referenced U.S. Pat. No. 4,647,817, Fähnrich et al, describes the circuit to which the present invention relates. This circuit has a heater circuit loop which includes a series circuit of two capacitors and a positive temperature coefficient (PTC) resistor in parallel to one of them. The heater circuit provides for good pre-heating of the electrodes and, therefore, rapid and flicker-free firing or ignition of the lamp, that is, discharge through the discharge space of the lamp. The circuit works well. The PTC resistor, however, remains in the circuit throughout the entire operating period of the lamp and, hence, some energy is used thereby, which is not converted into the desired light output. Continuous heating of the PTC resistor additionally thermally loads the circuit arrangement.

THE INVENTION

It is an object to improve the general circuit of the referenced U.S. Pat. No. 4,647,817, which uses a PTC resistor, to obtain rapid ignition with good pre-heating of the electrodes without, however, after firing of the lamp, involving energy loss by current flow through the PTC resistor; in other words, to improve the operating efficiency of the lamp-circuit combination and reduce energy consumption of the lamp including its accessory, starting circuit.

This object should, further, be accomplished with a simple circuit which utilizes only components readily applied to existing circuitry so that the circuit can be easily integrated into existing small housings for the accessory circuit.

Briefly, the arrangement includes a low loss starting circuit for the lamp which is coupled to a resonance circuit of known construction. The low loss starting circuit includes a PTC resistor and at least one diode component, connected to the PTC resistor. The components of the starting circuit are specifically dimensioned with respect to the voltage of the current supply circuit for the lamp. The current supply circuit for the lamp, typically, includes a rectifier and an inverter circuit, connectable to an energy supply source, typically the power supply network of customary network voltage and frequency, e.g. 110 V, 60 Hz, or 220 V, 50 Hz. The PTC resistor component and the at least one diode component are connected to the operating circuit such that, upon first energizing the current supply circuit from the energy source, the voltage between the lamp electrodes is at a level sufficient to pre-heat the lamp electrodes but below the level at which firing of the lamp can occur. As the lamp electrodes heat, current through the PTC resistor decreases due to the rise in resistance thereof, and the voltage between the lamp electrodes rises to a level at which, when the lamp electrodes are fully heated, it will cause a discharge across the electrodes and hence firing of the lamp. As soon as the lamp has fired, the voltage across the electrodes drops to the normal operating voltage between the electrodes which will be below the peak voltage of the current supply circuit—or of the energy supply source, respectively, which,—in effect, disconnects the PTC resistor due to the type of connection of the PTC resistor.

The method, in accordance with a feature of the invention, thus provides that the voltage across the lamp electrodes, upon first connection to the energy source, is kept so low that it is insufficient to cause firing of the lamp; this prevents initial flicker, and cold starting of the lamp is reliably prevented. During this time period, the electrodes are pre-heated. When the PTC resistor changes over to high resistance state, however, the resonance circuit present, as well known, increases the voltage across the electrodes. It also provides for increased pre-heating thereof. When the voltage across the electrodes rises above the value necessary for discharge across the electrodes, the lamp will fire. As soon as the lamp has fired, current through the PTC resistor, however, is interrupted since the voltage across the electrodes, when in normal operating conditions, will be less than the supply voltage thereto.

Dropping the supply voltage, and loss of current through the PTC resistor, causes the PTC resistor to cool. Thus, if the lamp is disconnected from the energy source, excellent pre-heating and optimum re-firing of the lamp is assured. Thus, the circuit can be used also for short-interval ON/OFF operation.

Various circuits can be devised, utilizing the PTC resistor—diode combination to provide a circuit for operating the lamp as explained.

If only one diode is used in combination with the PTC resistor, the voltage which the diode will block will only be that of one half-wave. Since, however, the inverter oscillator circuit so operates that upon initiation of oscillation, the oscillating circuit is damped, the amplitude at the other, not blocked half-wave, will rise only slowly.

The system has the advantage of not only reducing the overall energy requirement of the lamp—starter or accessory circuit combination, but also requiring less removal of heat in the operation of the accessory circuit, thus permitting a smaller accessory circuit construction.

DRAWINGS

DETAILED DESCRIPTION

Figure 1:
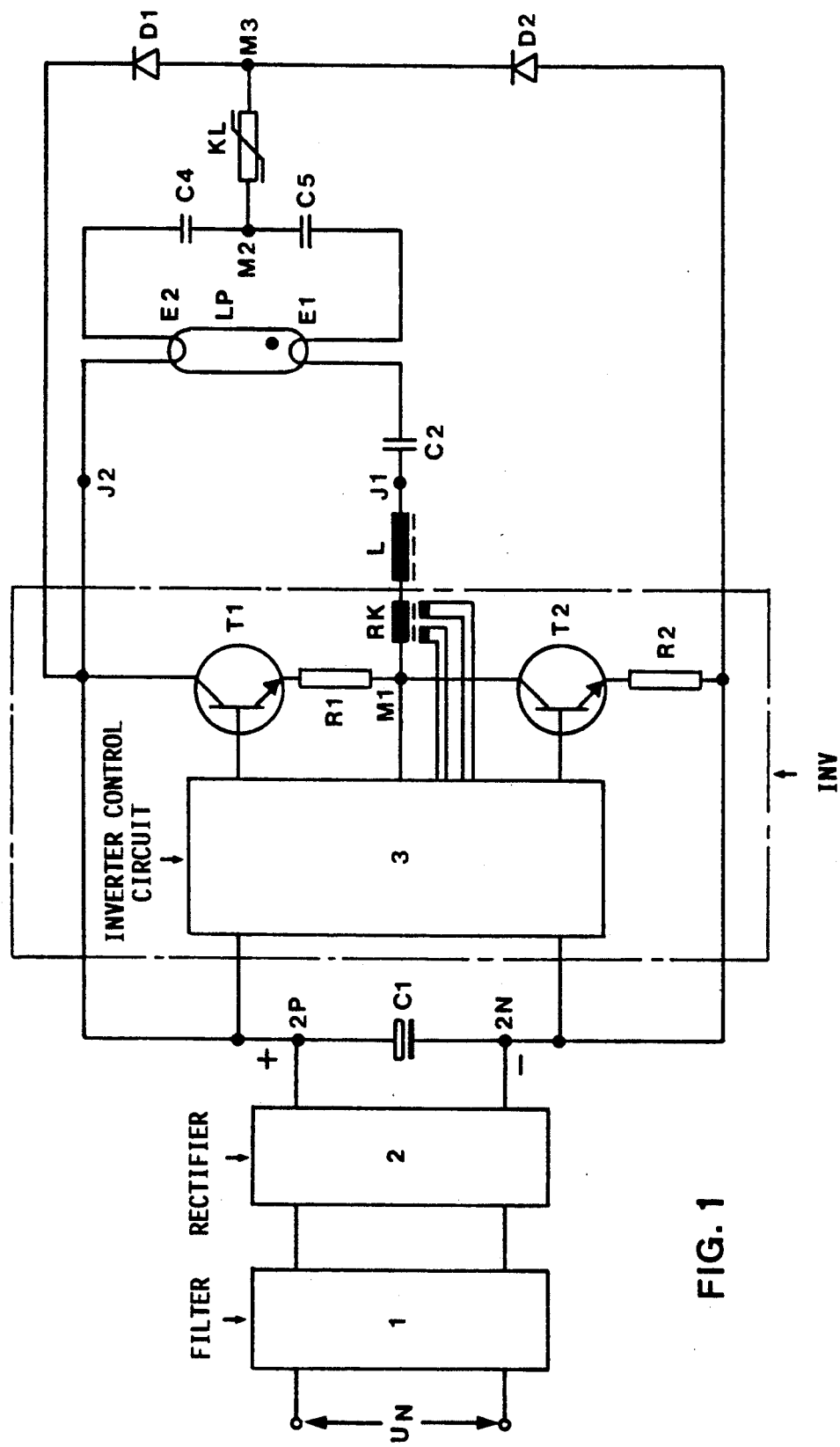
FIG. 1 is a schematic circuit diagram of a lamp in a starting and operating circuit, particularly adapted for operation from a 110 V power network or energy source.

The basic supply circuit, which will be described in detail only in connection with FIG. 1, can be of standard construction. An a-c energy source, schematically represented by arrow $U_N$, can be connected to a filter 1. The energy source for example, can be 220 V, 50 Hz, or 110 V, 60 Hz. The filter 1 is connected to a power rectifier 2 having rectified output terminals 2P and 2N providing, respectively, positive and negative rectified output power. A smoothing or filter capacitor C1 is connected across the terminals 2P, 2N.

An inverter circuit INV is connected across the terminals 2P, 2N; it includes a half bridge circuit having two transistors T1, T2, with associated emitter resistors R1, R2, and an inverter control circuit 3. A feedback transformer RK is connected to the common or center tap terminal M1 between the transistors T1, T2. The primary of the transformer RK is connected to the electrode E1 of the low-pressure discharge lamp LP, for example a compact fluorescent lamp. The secondaries of the feedback transformer RK are connected to the inverter control circuit 3 which, in turn, is connected to the bases of the transistors T1, T2. The second electrode E2 of the lamp LP is connected to the positive terminal 2P of the rectifier 2.

A resonance circuit is provided formed by the resonance inductance L, a coupling capacitor C2 and further resonance capacitors. The resonance inductance L and the coupling capacitor C2 are serially connected between the primary winding of the feedback transformer RK and the electrode E1, so that the resonance capacitor is connected to the heater circuit of the lamp LP.

Reverse current diodes are provided for the transistors T1, T2, not shown in the drawings, and customarily integrated in the transistors themselves. The construction of the filter 1, the rectifier 2, and the inverter control circuit 3 is well known; any suitable circuit may be used. The operation of such a half-bridge inverter circuit to operate a low-pressure discharge lamp is described, for example, in U.S. Pat. No. 4,782,268, Fähnrich et al.

The circuit of FIG. 1 is particularly adapted to operate a compact fluorescent lamp LP from a power network $U_N$ of alternating current at 110 V. The resonance capacitor uses two serially connected capacitors C4, C5 in the heater circuit loop of the lamp LP.

In accordance with a feature of the invention, the common connection M2 between the capacitors C4, C5 is connected through a positive temperature coefficient (PTC) resistor KL connected to a common terminal M3 between two serially connected diodes D1, D2. The diodes D1, D2 are connected to the positive terminal 2P and the negative terminal 2N, respectively, in d-c blocking direction.

When the circuit is used with comparatively low network voltages, for example in the range of between 100 to 120 V, it is desirable to split the resonance capacity in the heater circuit into two serially connected capacitors C4, C5 so that the peak voltage during operation of the lamp will be below the peak voltage of the supply. The common terminal M2 between the two capacitors is connected to the common terminal M3 between the two diodes D1, D2, which function as clamping diodes. Both clamping diodes are connected to block d-c; they connect the positive terminal 2P and the negative terminal 2N from the rectifier 2 together, however, in blocking direction.

The circuit is particularly suitable not only for 110 V supply but, also, to higher power lamps LP operated, for example, from a 220 V a-c network or supply UN.

Low power compact fluorescent lamps LP can be operated from a 220 V a-c network through a circuit which is simpler than that of FIG. 1.

Figure 2:
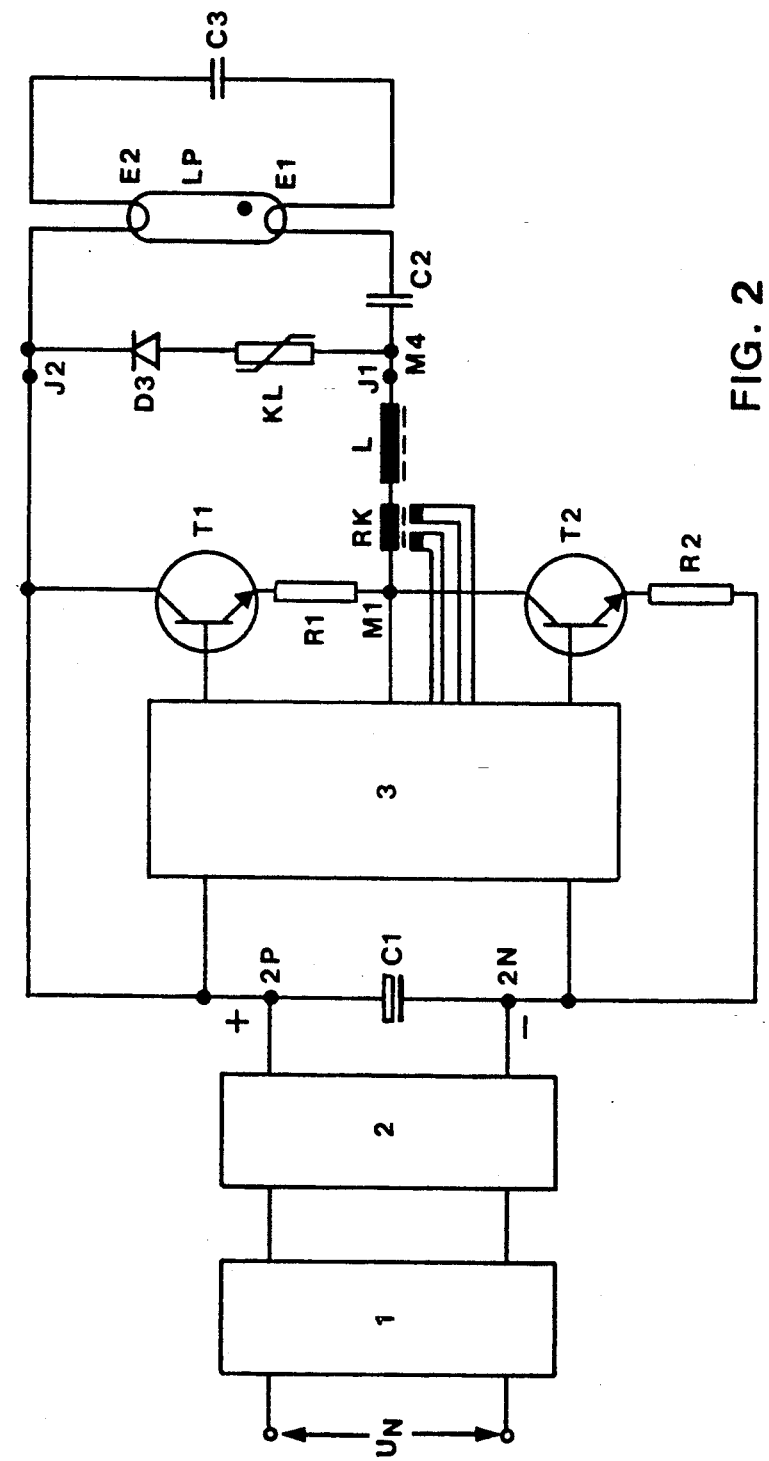
FIG. 2 is a schematic circuit diagram of the system adapted, for example, for a higher voltage power network or energy source, for example 220 V.

Referring now to FIG. 2:

The lamp LP is of low power, for example 9 W, 15 W, or the like; the circuit uses only a single resonance capacitor C3 in the heater circuit. In accordance with the present invention, the PTC resistor KL is connected to a terminal M4 between the inductance L and the coupling capacitor C2. The other terminal of the PTC resistor KL is connected through one diode D3 with one of the output terminals of the rectifier 2, as shown, to the terminal 2P. Diode D3 is connected in blocking direction with respect to the terminal 2P, and functions, again, as a clamping diode.

Figure 3:
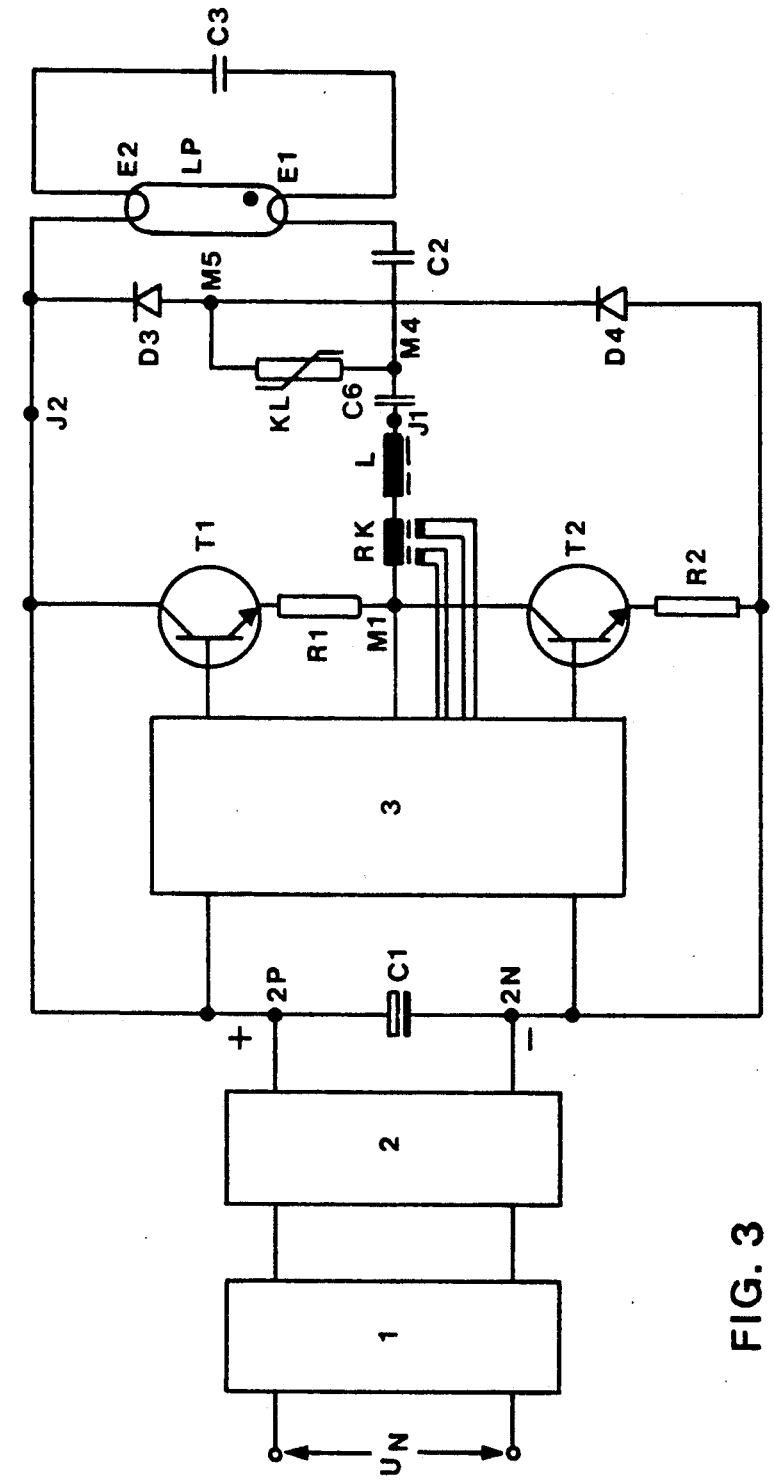
FIG. 3 is a diagram of a system also well adapted for operation from a 220 V alternating current network which utilizes two diodes.

For some types of lamps and/or a predetermined selection of circuit elements, it may be desirable to provide a further or second clamping diode for the PTC resistor KL. FIG. 3 shows such an arrangement in which a junction M5 between the PTC resistor KL and the clamping diode D3 is connected through a further diode D4 with the negative terminal 2N from the rectifier. The second diode D4, like diode D3, is connected in d-c blocking direction. Further, a capacitor C6 can be connected between the inductance L and the junction M4 with the PTC resistor.

The circuit, in accordance with the present invention, thus improves the portion of the circuit to the right of the terminals J1, J2 shown in the drawings. Three embodiments of such circuits are shown. The circuit of FIG. 3 shows an additional capacitor C6, with which pre-magnetization of the resonance inductance L is effectively prevented during the starting phase of the lamp, while the PTC resistor KL is still cold and has low resistance value.

OPERATION, AND METHOD OF STARTING LAMP LP

Upon first connecting the circuit of FIG. 1, 2 or 3 to the source of energy UN, the PTC resistor KL will be in the low resistance condition. Due to the damping in the oscillating circuit effected by the low resistance of the PTC resistor KL applied to the connection of the resistor in the lamp heating circuit, the peak voltage which is clamped by the respective diodes will be damped. In FIG. 1, the damping is applied at terminal M2, clamped by the diodes D1, D2. In FIGS. 2 and 3, the damping is effected at terminal M4, clamped by diode D3 and, if used, by diode D4 (FIG. 3). This clamped voltage is insufficient to permit ignition or firing of the lamp. The electrodes E1, E2, however, will be pre-heated since current can flow through the coupling capacitor C2. This pre-heating current will be higher insofar as the lamp operating voltage is lower. The pre-heating current increases, assisted by the resonance circuit, as the PTC resistor heats, since the resistance of the PTC resistor will then increase, thus decreasing the damping of the resonance circuit. Eventually, a discharge will occur across the electrode E1, E2, that is, the lamp will fire. After firing, the peak value of the operating voltage of the lamp will drop below the peak value of the supply voltage. No current will flow anymore through the PTC resistor, which will start to cool.

If only one diode is used—see FIG. 2—only one half-wave of the supply voltage will be clamped or blocked; thus, the PTC resistor KL and diode D3 will dampen only one half-wave. Upon starting of oscillations, any oscillating circuit is damped, and the amplitude of the other half-wave will rise only slowly.

Various types of diodes may be used, that is, diodes which switch rapidly, as well as diodes which switch comparatively slowly, in dependence on the other circuit components.

In one operating example for the circuit, for use with an 18 W compact fluorescent lamp, to be supplied from a 220 V power network, a circuit in accordance with FIG. 3 can be constructed using the following components:

C1: 47 μF
T1, T2: BUV 93
R1, R2: 1Ω
RK: toroidal core (13×7×5), primary 10 turns, secondaries 2 turns each
C6: 0.1 μF
KL: PTC resistor 600Ω nominal resistance (at 25° C.)
D3, D4: 1N 4937
C2: 47 nF
C3: 4.7 nF
L: 1.35 mH.

In another operating example of the circuit, for use with a 11 W compact fluorescent lamp, to be supplied from a 110 V power network, a circuit in accordance with FIG. 1 can be constructed using the following components C1: 47 μF
T1, T2: BUV 93
R1, R2: 1Ω
RK: toroidal core (13×7×5), primary 10 turns, secondary 2 turns each
KL: PTC resistor 250Ω nominal resistance (at 25° C.)
D1, D2: 1N 4937
C2: 47 nF
C3: 4.7 nF
L: 1.35 mH
C4: 6.8 nF
C5: 10 nF.

Various changes and modifications may be made, and any feature of any one of the embodiments described herein may be used with any of the others, within the scope of the inventive concept.

I claim:

1. A low loss operating circuit for a low pressure discharge lamp (LP) connectable to a source (UN) of electrical energy, said lamp having two heatable electrodes (E1, E2), spaced from each other and located in a discharge vessel;

said circuit having a power supply circuit selectively connectable to said source (UN) of energy, having a rectifier (2) supplying rectified output at output terminals (2P, 2N);

an inverter circuit (INV) coupled to the rectifier (2), said inverter circuit having a half-bridge transistor oscillator circuit including two alternatingly switching connected transistors (T1, T2), defining a common terminal (M1) between said transistors, and an inverter control circuit (RK, 3) coupled to the transistors to control switching thereof;

a coupling circuit for connecting the lamp (LP) to the power supply circuit having a first connection between a first one (E1) of said lamp electrodes to the common terminal (M1), said first connection including a series resonance circuit comprising a resonance inductance (L), a coupling capacitor (C2) and a resonance capacitance (C3; C4, C5), said resonance inductance (L) and the coupling capacitor (C2) being connected serially between said common terminal (M1) and said one (E1) electrode, and the resonance capacitance (C3; C4, C5) being connected to both electrodes (E1, E2) and hence in parallel to the lamp; and a second connection between the second one (E2) of said lamp electrodes and one terminal of said power supply circuit;

and comprising, in accordance with the invention, a low loss starting circuit for the lamp, coupled to the resonance circuit, said low loss starting circuit comprising a positive temperature coefficient (PTC) resistor (KL) component and at least one diode component (D1, D2; D3, D4) connected to the PCT resistor and in d-c blocking direction, to the power supply circuit;

wherein some components of said starting circuit are connected with the components of the operating circuit such that, (a) upon first connection of the power supply circuit to said energy source (UN), the voltage between the lamp electrodes (E1, E2) is at a level sufficient to pre-heat the electrodes but below the level at which discharge between the electrodes, and hence firing of the lamp can occur;

(b) upon maintaining said connection to the energy source, and heating of the PCT resistor (KL), and consequent rise in the resistance thereof, the voltage between the lamp electrodes (E1, E2) rises to a level at which discharge occurs across the electrodes (E1, E2), and hence firing of the lamp; and (c) after firing of the lamp and drop of the voltage between the electrodes thereof, the peak operating voltage is lowered below the peak voltage supplied by said power supply circuit to effectively inhibit current flow through the PTC resistor.

2. The circuit of claim 1, wherein the resonance capacity comprises two serially connected capacitors (C4, C5) defining a common capacity terminal (M2) therebetween;

said PTC resistor having one terminal coupled to said common capacitor terminal (M2); and wherein the other terminal of the PTC resistor (KL) is coupled to a junction (M3), and said at least one diode component comprises two diodes (D1, D2) connected to said junction (M3), each one of said diodes (D1, D2) being, respectively, connected to a respective one of said rectifier output terminals (2P, 2N) and poled in blocking direction with respect to d-c output from said rectifier terminals.

3. The circuit of claim 1, wherein (FIG. 2) the series circuit of the resonance inductance (L) and the coupling capacitor (C2) define a resonance circuit junction (M4);

and wherein said at least one diode component (D3) and said PTC resistor (KL) are connected in series between said resonance circuit junction (M4) and one (2P) of said rectifier output terminals.

4. The circuit of claim 3, wherein (FIG. 3) said PTC resistor (KL) is connected to said resonance circuit junction (M4), the other terminal of said PTC resistor (KL) defining a diode junction (M5) with said at least one diode component (D3); and wherein a further diode (D4) is provided, connected to said PTC diode junction (M5), the further diode (D4) being coupled to the other one (2N) of said recitifier output terminals.

5. The circuit of claim 4, further comprising an additional capacitor (C6) connected between the series inductance (L) and said resonance circuit junction (M4).

6. A low loss operating circuit for a low pressure discharge lamp (LP) connectable to a source (UN) of electrical energy, said lamp having two heatable electrodes (E1, E2), spaced from each other and located in a discharge vessel;

said circuit having a power supply circuit selectively connectable to said source (UN) of energy, having a rectifier (2) supplying rectified output at output terminals (2P, 2N);

an inverter circuit (INV) coupled to the rectifier (2), said inverter circuit having a half-bridge transistor oscillator circuit including two alternatingly switching connected transistors (T1, T2), defining a common terminal (M1) between said transistors, and an inverter control circuit (RK, 3) coupled to the transistors to control switching thereof;

a coupling circuit for connecting the lamp (LP) to the power supply circuit having a first connection between a first one (E1) of said lamp electrodes to the common terminal (M1), said first connection including a series resonance circuit comprising a resonance inductance (L), a coupling capacitor (C2) and a resonance capacitance (C3; C4, C5), said resonance inductance (L) and the coupling capacitor (C2) being connected serially between said common terminal (M1) and said one (E1) electrode, and the resonance capacitance (C3; C4, C5) being connected to both electrodes (E1, E2) and hence in parallel to the lamp; and a second connection between the second one (E2) of said lamp electrodes and one terminal (2P) of said power supply circuit;

and comprising, in accordance with the invention, a low loss starting circuit for the lamp, coupled to the resonance circuit, said low loss starting circuit comprising a positive temperature coefficient (PTC) resistor (KL) component and at least one diode component (D1, D2; D3, D4) connected to the PTC resistor and in d-c blocking direction, to one (2P) of the output terminals of the power supply circuit, wherein some components of said starting circuit are connected to other components of the operating circuit such that, (a) upon first connection of the power supply circuit to said energy source (UN), the voltage between the lamp electrodes (E1, E2) is at a level sufficient to pre-heat the electrodes but below the level at which discharge between the electrodes, and hence firing of the lamp can occur;

(b) upon maintaining said connection to the energy source, and heating of the PTC resistor (KL), and consequent rise in the resistance thereof, the voltage between the lamp electrodes (E1, E2) rises to a level at which discharge occurs across the electrodes (E1, E2), and hence firing of the lamp; and (c) after firing of the lamp and drop of the voltage between the electrodes thereof, the peak operating voltage is lowered below the peak voltage between the output terminals (2P, 2N) of said power supply circuit to effectively inhibit current flow through the PTC resistor.

7. The circuit of claim 6, wherein the resonance capacity comprises two serially connected capacitors (C4, C5) defining a common capacity terminal (M2) therebetween;

said PTC resistor having one terminal coupled to said common capacitor terminal (M2); and wherein the other terminal of the PTC resistor (KL) is coupled to a junction (M3), and said at least one diode component comprises two diodes (D1, D2) connected to said junction (M3), each one of said diodes (D1, D2) being, respectively, connected to a respective one of said rectifier output terminals (2P, 2N) and poled in blocking direction with respect to d-c output from said rectifier terminals.

8. The circuit of claim 6, wherein (FIG. 2) the series circuit of the resonance inductance (L) and the coupling capacitor (C2) define a resonance circuit junction (M4);

and wherein said at least one diode component (D3) and said PTC resistor (KL) are connected in series between said resonance circuit junction (M4) and one (2P) of said rectifier output terminals.

9. The circuit of claim 8, wherein (FIG. 3) said PTC resistor (KL) is connected to said resonance circuit junction (M4), the other terminal of said PTC resistor (KL) defining a diode junction (M5) with said at least one diode component (D3); and wherein a further diode (D4) is provided, connected to said PTC diode junction (M5), the further diode (D4) being coupled to the other one (2N) of said rectifier output terminals.

10. The circuit of claim 9, further comprising an additional capacitor (C6) connected between the series inductance (L) and said resonance circuit junction (M4).

11. A method of starting and operating a low-pressure discharge lamp (LP) connected to an operating circuit which is connectable to a source (UN) of electrical energy, said lamp having two heatable electrodes (E1, E2), spaced from each other and located in a discharge vessel;

said circuit having a power supply circuit selectively connectable to said source (UN) of energy, having a rectifier (2) supplying rectified output at output terminal (2P, 2N);

an inverter circuit (INV) coupled to the rectifier (2), said inverter circuit having a half-bridge transistor oscillator circuit including two alternatingly switching connected transistors (T1, T2), defining a common terminal (M1) between said transistors, and an inverter control circuit (RK, 3) coupled to the transistors to control switching thereof;

a coupling circuit for connecting the lamp (LP) to the power supply circuit having
  a first connection between a first one (E1) of said lamp electrodes to the common terminal (M1),
  said first connection including a series resonance circuit comprising
    a resonance inductance (L), a coupling capacitor (C2) and a resonance capacitance (C3; C4, C5),
    said resonance inductance (L) and the coupling capacitor (C2) being connected serially between said common terminal (M1) and said one (E1) electrode, and
    the resonance capacitance (C3; C4, C5) being connected to both electrodes (E1, E2) and hence in parallel to the lamp; and
  a second connection between the second one (E2) of said lamp electrodes and one terminal of said power supply circuit;

and comprising, in accordance with the invention,
operating the lamp, upon connection to said energy source, in the following sequence:
  (a) upon first connection of the power supply circuit to the energy source (UN) conducting current through said electrodes (E1, E2) to pre-heat the electrodes, while maintaining the voltage between said electrodes at a level below that at which discharge across the electrodes, and hence firing of the lamp can occur;
  (b) continuing to pass current through the electrodes at a decreasing rate, while increasing the voltage between the electrodes (E1, E2), until it rises to a level at which discharge across the electrodes occurs, and hence firing of the lamps; and
  (c) after firing of the lamp, dropping the operating voltage between teh electrodes to have a peak level which is less than the peak voltage supplied between said power supply circuit, and wherein the step of conducting current through the electrodes comprises
conducting electrode current through a positive temperature coefficient (PTC) resistor (KL) and at least one diode (D1, D2; D3, D4) which is clamped to the operating voltage effective across the electrodes (E1, E2) of the lamp.

12. The method of claim 11, wherein two diodes are provided, coupled to the PTC resistor (KL), and one each being connected to an output terminal (2P, 2N) of said power supply.

13. The method of claim 11, wherein only one diode (D3) is connected to said PTC resistor (KL) and, in turn, is coupled to the power supply.

* * * * *